Figure 1:
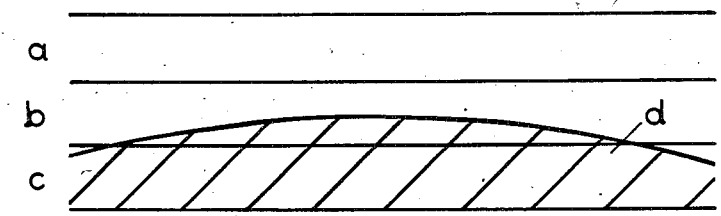

Aug. 20, 1957     T. C. NUTTALL     2,803,406
APPARATUS FOR COUNTING OBJECTS
Filed May 10, 1955     4 Sheets-Sheet 1

INVENTOR
THOMAS CAYTON NUTTALL
BY Hane and Nydick
ATTORNEYS

Aug. 20, 1957  T. C. NUTTALL  2,803,406
APPARATUS FOR COUNTING OBJECTS
Filed May 10, 1955  4 Sheets-Sheet 3
FIG. 4
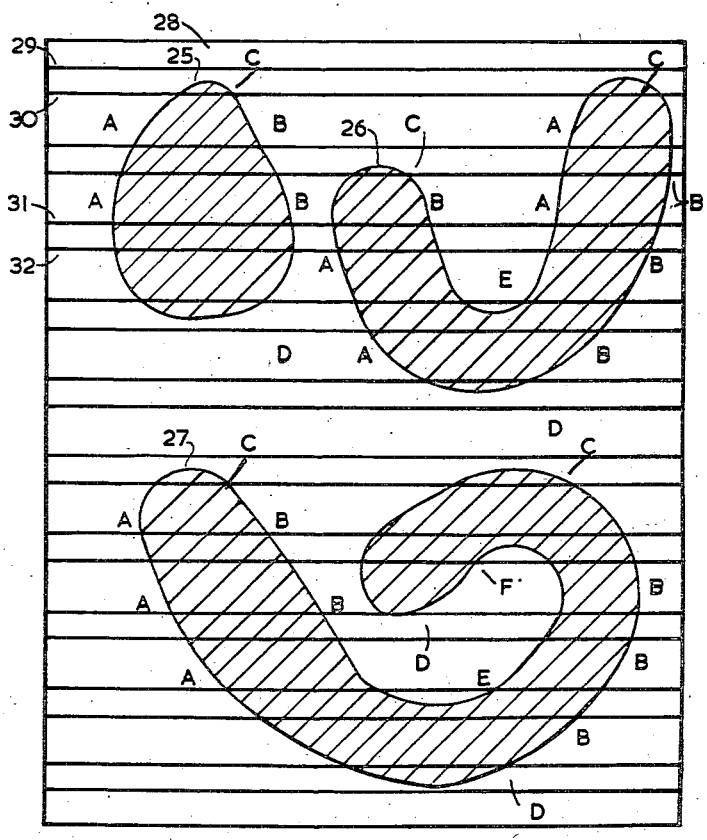
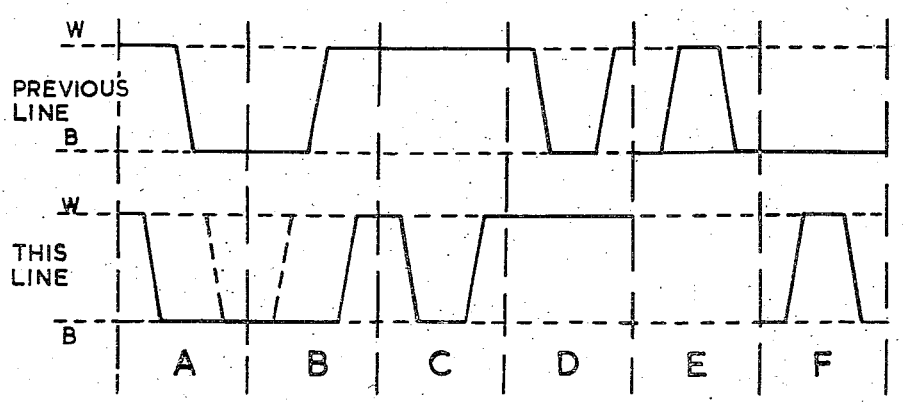
FIG. 5
INVENTOR
THOMAS CAYTON NUTTALL
By Hane and Nydick
ATTORNEYS

# United States Patent Office 2,803,406
Patented Aug. 20, 1957

2,803,406
APPARATUS FOR COUNTING OBJECTS

Thomas Cayton Nuttall, Upper Norwood, London, England, assignor to Cinema-Television Limited, London, England Application May 10, 1955, Serial No. 507,370

Claims priority, application Great Britain May 28, 1954

9 Claims. (Cl. 235—92)

The present invention relates to methods and apparatus for enumerating objects lying within the field of a scanning device such that the field is traversed in contiguous lines by a scanning element, of size small compared with that of the objects to be counted and arranged to produce an electrical signal of which the magnitude depends upon whether or not the element rests upon an object of the kind to be counted.

Apparatus of this kind is used more especially in the examination of microscopic preparations, for example in the evaluation of dust slides or in obtaining blood counts, but its application is not limited to such uses.

Various methods of performing this function have been proposed. In general, these employ a scanning system in which an area containing the objects to be counted is traversed in a pattern of closely spaced lines by a scanning element so as to derive an electrical signal which is then quantized to yield a signal having one value corresponding to the passage of the scanning element over an object and another value when the scanning element does not encounter an object.

In a system of this kind it is not sufficient merely to use a counter to count the number of changes in signal level in a particular direction resulting from such a scanning operation. The count thus obtained would be proportional to the number of objects only in the special case where all the objects had a circular outline of constant size. When the objects are of varying sizes, and more particularly when they have irregular and perhaps reentrant outlines randomly orientated with respect to the direction of the scanning lines, it becomes necessary to derive further information by comparing information obtained as a result of scanning along a line with information obtained from an adjacent area not included within the line being scanned.

It is also necessary that the structure of the scanning pattern shall be fine enough to ensure that a particle of the minimum size which it is required to count shall give rise during at least one scanning line to a signal which will be appropriately quantized. This requirement has the corollary that some objects will give rise to more than one such signal. It is therefore necessary, if an accurate count not requiring statistical correction is to be obtained, to provide some means for distinguishing between a signal arising from a first (or last) scanning of an object and signals arising from subsequent (or previous) scannings of the same object.

Most hitherto-proposed methods of accomplishing this object have employed some form of double-beam scanning in which the area containing the objects is scanned simultaneously by two scanning elements moving along adjacent lines and the signals arising from the two scanning processes are compared to determine whether or not an object detected by the element scanning one line is also present in the other line.

The present invention is based upon the recognition of the fact that unless a single quantizing operation only is performed on information derived by scanning a given line, errors will be introduced into the final count. For this reason the double-spot methods of scanning while useful for many purposes, cannot attain absolute accuracy.

It is an object of the invention to provide apparatus and methods for enumerating objects dispersed in a contrasting field in which a signal derived by scanning an object in any one line shall be quantized once and once only.

It is a further object of the invention to provide apparatus for enumerating objects in which a count is obtained only when a scanning element encounters an object for the first (or last) time.

It is another object of the invention to provide apparatus and methods for enumerating objects in which corrections may be obtained for false counts due to objects of complex form.

Figure 2:
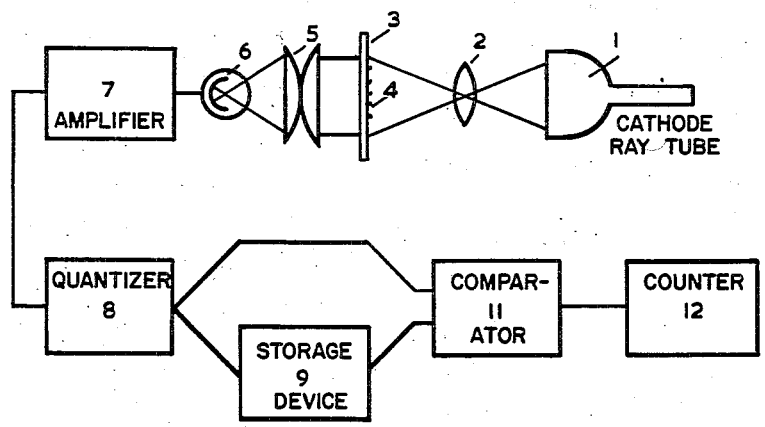
Figure 3:
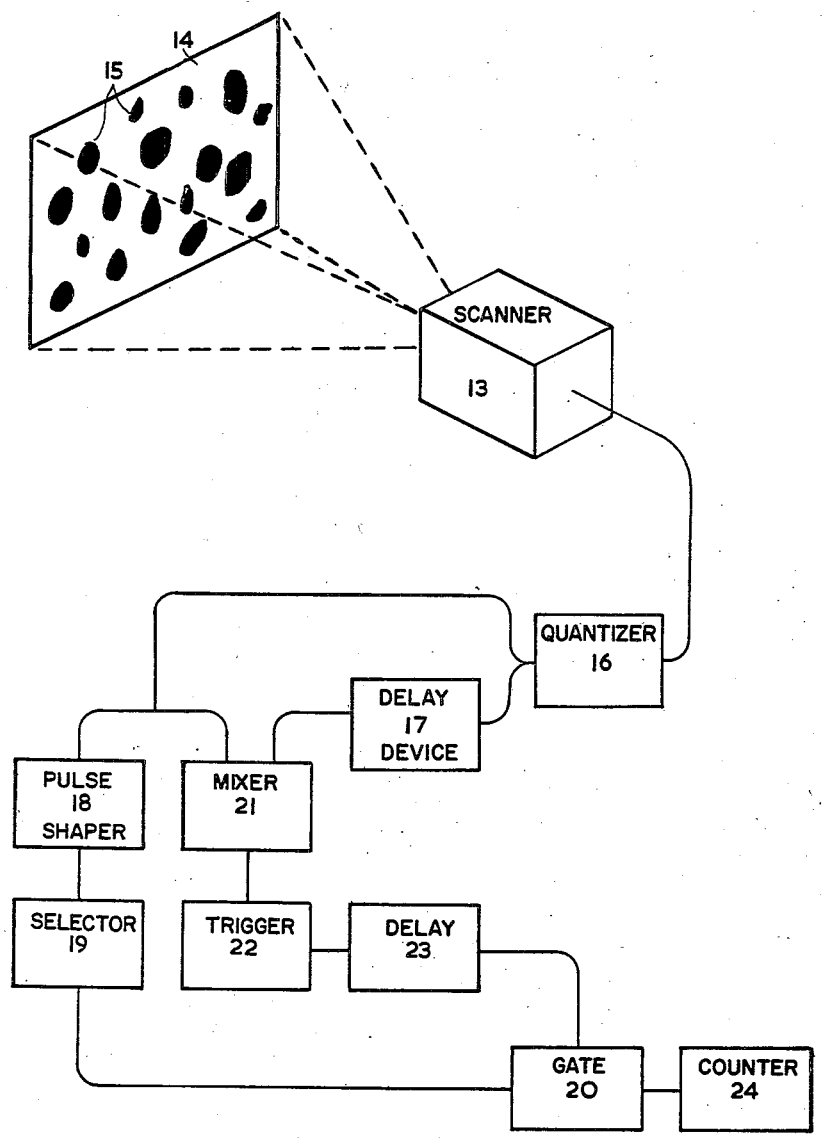
Figure 6:
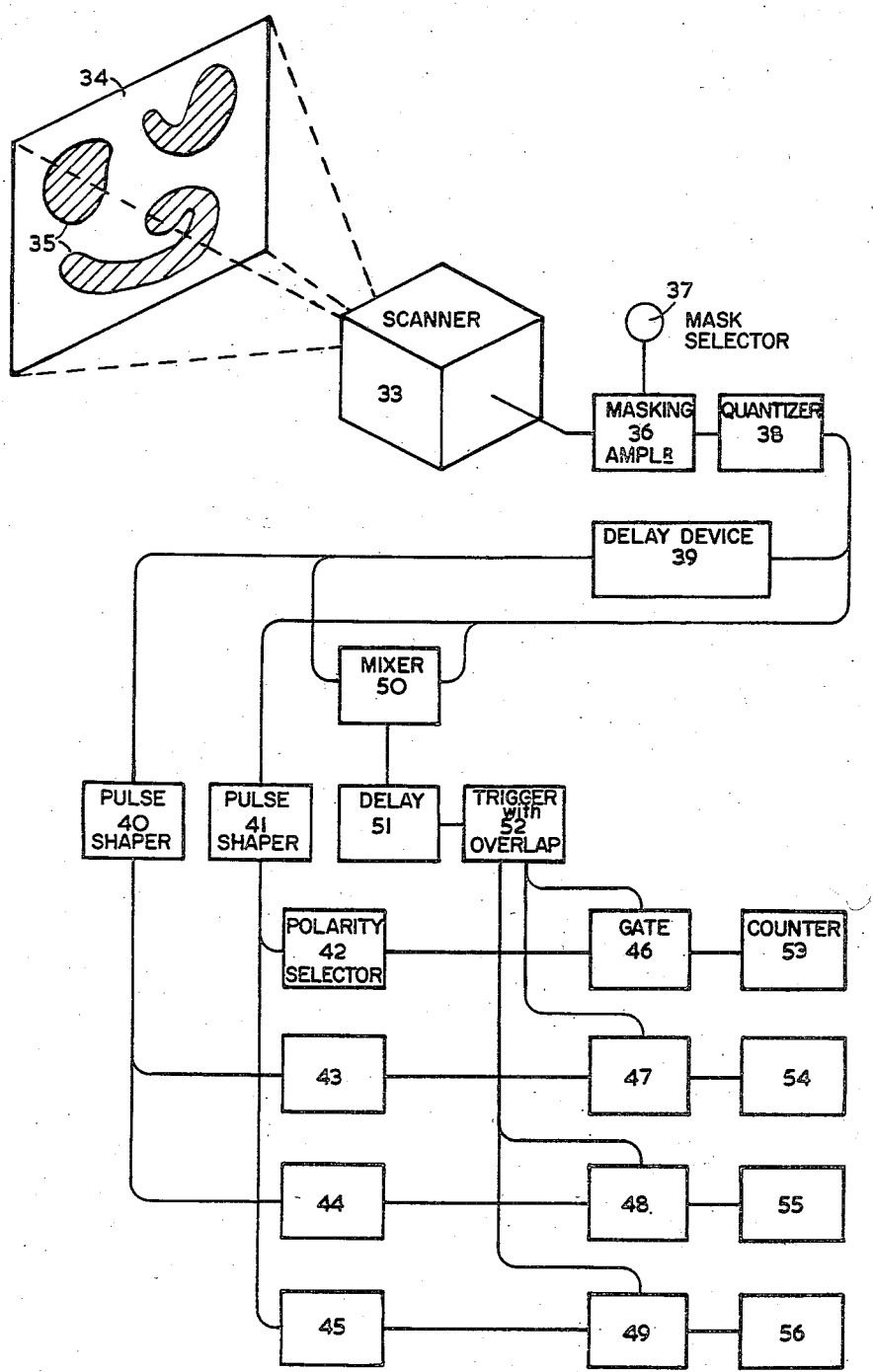

The features of the invention which are believed to be novel are set forth with particularity in the appended claims. The organization and manner of operation of the invention may best be understood by reference to the following description taken in conjunction with the accompanying drawings in which:

Figure 1 is a diagram illustrating the advantage gained by the use of the present invention, Figure 2 is a schematic diagram illustrating one embodiment of apparatus for carrying out the invention, Figure 3 is a schematic diagram illustrating another embodiment of apparatus for carrying out the invention, Figure 4 is a diagram illustrating part of a scanned field containing objects of different shapes, Figure 5 illustrates the signals which arise at certain points in the scanning of the field shown in Figure 4 and Figure 6 is a block schematic diagram of one form of apparatus operating in accordance with the present invention, to provide counts corrected for objects of complex shape.

In any counting system it is necessary that the area which may contain the objects to be counted shall be scanned by a scanning element moving over the area in lines sufficiently close together to ensure that any object to be counted will be impinged by the scanning element moving along at least one line. This carries the implication that some objects will be scanned in two or more adjacent lines, so that it becomes necessary to compare the signal derived by scanning each line with that derived during the scanning of an adjacent line and to record a count if an object is detected in any line at a point where an object is not detected in an adjacent line. This argument applies no matter in what temporal order the lines are scanned. During this operation the situation illustrated in Figure 1 will frequently arise.

This figure shows a small part of each of three consecutively scanned adjacent lines a, b and c, of which the middle line has its centre tangential to the convex edge of a dark object d. The signal yielded by scanning line a will be white, that from line b will be gray and that from line c will be black. In any counting system a "grey" signal must be judged to be either black or white. It ought not to matter which decision is made, nor does it, provided that the decision is made once and once only as in apparatus according to the present invention.

In a double-spot counting system, however, the decision is made twice, as the line is scanned by each of the two spots. The probability of the decision made in the case discussed being the same on both occasions is rather small, for it is improbable that the two spots will follow exactly the same paths and, if they do, a "borderline" decision will be subject to great influence by circuit noise.

Where the two decisions are identical, a count will obviously be recorded and if a "black" decision on the first scan is followed by a "white" decision at the second scan two counts will be recorded, since in two successive scans of the double spot a "black" signal from the leading spot will be compared with a "white" signal from the trailing spot, but if a "white" decision is made on the first scanning of the line and a "black" decision on the second scanning, a count will not be recorded, since comparion of the signals yielded by the two scans will indicate "no change" on each of the two consecutive scans over the boundary of the object.

The use of the present invention overcomes this difficulty since the decision, once made, is adhered to, so that a "white" decision on scanning the line, which does not cause a count to be recorded when it is compared with the "white" signal from the previously scanned line, will inevitably produce a count when it is compared with the "black signal" of the subsequent line, while a "black" decision on scanning the line will produce a count at that time.

Figure 2 shows, by way of example only, one way of carrying out the present invention, which is, of course not limited to the use of the scanning means disclosed. In Figure 2, a cathode ray tube 1 is used as a scanning source. Its spot is deflected over the screen by conventional means (not shown) so as to produce a pattern of contiguous parallel lines. The raster thus formed is imaged by a lens 2 upon a transparent supporting member 3 on which are disposed objects 4 to be counted. Light passing through member 3 is collected by a condenser lens 5 and thrown upon the cathode of a photoelectric cell 6. The electrical signal thus derived is amplified by a conventional amplifier 7 and passed to a quantizing device 8, which may be any suitable known form of trigger circuit giving an output only when the amplitude of the input signal exceeds a certain chosen value.

The output from device 8 is divided. One part is applied to a suitable storage device 9 which may be of any suitable type known in the art, having an output corresponding to the input signal but delayed by the time taken to scan one line of the field, while the other part is taken directly to a comparator device 11, to which the delayed signal also is applied.

Device 11 is arranged to compare the signals applied to it and to give an output when and only when the direct input in any line differs from the delayed input by a signal indicating the presence of an object in the scanned field.

Device 11 therefore gives an output signal when any object is scanned for the first time; these signals are applied to a counter arrangement 12, which may be of any kind suitable to the speed of the scanning process. Suitably, device 12 comprises a chain of electronic decade counter circuits of known kind.

The operation of an arrangement for enumerating objects which provides the facility that objects of simple, i .e., no-reentrant, outline will be counted once only will now be described with reference to Figure 3.

In Figure 3, 13 is a television scanner of known type adapted to derive electrical signals corresponding to the line-by-line scanning of an area 14 containing objects such as 15 which are to be counted. These objects are shown as black on a white ground. The television scanner may conveniently comprise a cathode ray tube on the screen of which is produced a scan which is imaged upon the area 14, so that a photocell exposed to light reflected from the area will yield a current varying in accordance with the instantaneous position of the image of the spot. Alternatively an image of area 14 may be projected upon the photosensitive target of a known form of television pickup tube to be converted in known manner into an electrical signal.

The electrical signals corresponding to the scanning of area 14, in whatever manner they are derived, are passed into a quantizing device 16, which may conveniently be a known form of amplitude discriminator which is adjusted to give an output signal having a first constant value, which will hereinafter be referred to as "black," corresponding to those portions of the input signal derived when an object is scanned and a second constant value, hereinafter referred to as "white," for all other input signals.

The output from the quantizer 16 is divided, part going to a delay device 17 which must be such as to store the signal and reproduce it after a time equal to that taken by the scanning element in traversing one line of its scanning pattern. For most practical purposes it will probably be the most convenient to employ a storage system comprising a wire along which pulses are launched as acoustic waves and from which they are recovered again as electrical signals by spaced coils surrounding the wire so as to produce or respond to magnetostrictive phenomena in the wire.

The undelayed part of the output from discriminator 16 is applied to a pulse forming device 18, conveniently a differentiating circuit, which evolves from the quantized signals applied to it signals corresponding temporally to the scanning of the two edges of each object encountered in any one scanning line and having characteristics by which they may be separated. When a differentiating circuit is used the evolved pulses will be positive- and negative-going and may therefore readily be separated by a polarity-sensitive device such as a diode rectifier or biased-off thermionic valve. These signals are arranged to have an appropriately brief duration which is hereafter designated as $T_1$. This duration must be short compared with the duration of the signal derived by scanning an object of the minimum size which is to be counted.

Whatever the distinctive characteristics of the signals evolved by device 18 they are applied to a selector circuit 19 which is arranged to give an output corresponding only to those signals derived when the scanning element passes off an object i. e., on a transition from black to white. The signals thus selected are applied as the controlled input to a gate circuit 20, which may be of any suitable known type, such that when the circuit is "opened" by the application of a suitable signal to its control input, an output corresponding to the selected signals is obtained.

Meanwhile, the delayed and undelayed signals are added in a mixer circuit 21 and are applied to a bistable trigger circuit 22. This trigger circuit has an overlap such that it remains in one or other of its stable conditions unless both the signals applied to the mixer change in the same sense from one of their two possible values to the other, that is, the trigger will change from one stable condition to the other only if both signals, which are initially the same, change from "black" to "white" or vice versa.

The circuit is arranged to provide a control signal which opens gate 20 unless its condition is changed by both signals applied to mixer 21 becoming black. The output from trigger 22 is applied to gate 20 through a delay device 23, conveniently a short static delay line, which delays the signal by a time $T_2$. The necessity for this delay is explained below.

The signals from differentiator 19 which pass through gate 20 are applied to a counter circuit 24 of any kind suitable to the scanning speed which is employed. An electronic counter employing a number of decade stages of the type evolved by the addition of feedback to a four-stage binary counter is adequate for the purpose.

Signals are thus passed to the counter when and only when an object is scanned for the first time.

This may be shown as follows:

Before any object at all is encountered the signals from both preceding and current lines will be white, so that the gate will be open. When an object is first encountered the current-line signal will change from white to black, leaving the gate still open since a concurrent change in both signals is required to alter its condition. When the scanning element passes off the object there will be a black-to-white transition in the current-line signal which will result in a pulse being applied to the open gate. This pulse will therefore be counted.

When the object is encountered for the second or any subsequent time, then at sometime during the resultant black signal in the current line there will arise a black signal in the preceding line. When this occurs the gate will be closed and since at least the current-line signal must remain black until the scanning element leaves the object the gate must remain closed until this latter event occurs and the pulse will therefore not be counted.

It will be appreciated that this event may also result in the gate being opened, but the delay $T_2$ which has been introduced between trigger and gate circuits is made greater than the pulse duration $T_1$, so that the gate does not open until after the termination of the pulse. The upper limit to the delay period is set by the obvious requirement that the system shall be capable of resolving objects which yield pulses separated by a certain minimum time $T_3$, so that the condition for the allowable delay period is $T_1 < T_2 < T_3$.

If, for any reason, it is required to count objects which have been scanned for the last rather than the first time, the only change necessary in the apparatus described above is to feed the pulse-forming device 6 with the delayed, preceding-line signals from device 5 instead of with undelayed signals direct from quantizer 4, so that the pulses counted result from black-to-white transitions in the preceding line which arise when the gate is open. It will be seen that such signals arise only at the last scanning of an object.

The nature of the scanning pattern employed may vary widely and is not limited to the conventional scan of parallel lines parallel to a side of the viewed area. Any pattern may be used which covers the area in a series of closely spaced lines such that the scanning element reaches adjacent points of adjacent lines at equal time intervals throughout the scanning cycle.

The apparatus described above will be seen to be such that it counts each object in its field of view once only, provided that the objects have no re-entrant boundaries.

There will now be described with reference to Figures 4–6 apparatus which enables correction for objects of complex form to be obtained.

In Figure 4, objects 25, 26 and 27 are shown dispersed in a field bounded by line 28. The field is considered to be scanned downwards in a continuous pattern of closely spaced parallel lines of which only certain consecutive pairs such as 29, 30; 31, 32 are shown.

The signal derived in the scanning of each line is quantized and is stored so that it may be used for comparison with the signal derived during the scanning of the adjacent line to determine when an object is scanned for the first (or last) time.

To do this, the apparatus must be capable of distinguishing between certain different classes of event which arise during the comparison of a signal derived during the current line with that derived during the previous line in scanning an area containing dispersed objects. The six possible classes of event occur at the places indicated in Figure 4 by letters A–F, which denote the events illustrated and correspondingly lettered in Figure 5.

The upper of the two portions of Figure 5 shows the signals derived during the scanning of the upper line of a pair of lines as shown in Figure 4 that is, the "previous line" and the lower portion illustrates signals derived during the scanning of the lower line of the pair, that is "this line." In each case the signals can have only one of two values; black, indicated by the horizontal lines B, when the scanning spot encounters an object and white, indicated by the horizontal lines W when it is on the background.

The possible events are as follows:

A. Both signals are initially "white" and each changes over to "black." The transitions may be simultaneous or in either sequence and spaced by any time interval.

B. Both signals are initially "black" and each changes over to "white." The transitions may be simultaneous or in either sequence and spaced by any time interval.

C. Both signals are initially "white"; "this line" changes to "black" and back again to "white," without any change in the "previous line."

D. Both signals are initially "white"; the "previous line" changes to "black" and back again without any change in "this line."

E. Both signals are initially "black"; the "previous line" changes to "white" and back again without any change in "this line."

F. Both signals are initially "black"; "this line" changes to "white" and back again without any change in the "previous line."

It will be noted that events A and B each cover the two cases corresponding to different sequences of transitions, so that there are in all eight different types of event, but all the four types of event classed as "A" or "B" have no significance in the final count.

An A or B event occurs when a boundary crossed by the "previous line" is crossed again by "this line," and so no new information is revealed by comparison between the lines. These events occur frequently but need not be counted.

A C event, or commencement, occurs when "this line" breaks into and out of an outline which was not encountered by the "previous line"; in other words a new boundary has been discovered.

A D event, or termination, occurs when the "previous line" broke into and out of a boundary which is not encountered in "this line"; when, in other words a previously recorded boundary has been left behind.

An E event, or convergence, occurs when two portions of boundary, previously recorded as independent, prove to be parts of one common outline.

An F event, or divergence, occurs when an object previously recorded as simple, bifurcates so as to be encountered at separate parts of a line.

If the number of objects is determined by counting the number of C events and the area scanned includes objects having re-entrant outlines, then an arcuate count can be assured, in accordance with the present invention, by subtracting from the number thus obtained the number of E events recorded during the scanning of the same area. If, on the other hand, a count of D events is made, then the number of F events must be subtracted.

The apparatus shown in Figure 6 comprises a television scanner 33 of known type adapted to derive electrical signals corresponding to the line-by-line scanning of an area 34 containing objects such as 35 which are to be counted. These objects are shown as black on a white ground. The television scanner may conveniently comprise a cathode ray tube on the screen of which is produced a scan which is imaged upon the area 34, so that a photocell exposed to light reflected from the area will yield a current varying in accordance with the instantaneous position of the image of the spot. Alternatively an image of area 12 may be projected upon the photosensitive target of a known form of television pick-up tube to be converted in known manner into an electrical signal.

The electrical signals corresponding to the scanning of area 34, in whatever manner they are derived, are passed through a masking amplifier 36 of a general kind well known in the television art in which signals produced when the scanning spot moves outside the boundary 28 of the scanned area are given a definite value. In this case it is arranged that this value may be that corresponding either to "black" or to "white" under the control of a device 37. Such an amplifier consists merely of circuit means for adding to the signal, during the flyback interval of the scanning process, a pulse of appropriate polarity and of amplitude sufficient to ensure that during the pulse the output signal has always a value exceeding the normal excursion of the signal in the required polarity. The added pulse signal will ensure that the subsequent quantizing action operates to yield during the flyback intervals of the scanning process a signal having either a "black" or a "white" value according to the polarity of the added signal. The signals pass into a quantizing device 38, which may conveniently be a known form of amplitude discriminator which is adjusted to give an output signal having a first, constant value, which will hereinafter be referred to as "black," corresponding to those portions of the input signal derived when an object is scanned and a second, constant value, hereinafter referred to as "white," for all other input signals.

The output from the quantizer 38 is divided, part going to a delay device 39 which must be such as to store the signal and reproduce it after a time equal to that taken by the scanning element in traversing one line of its scanning pattern. For most practical purposes it will probably be most convenient to employ a storage system comprising a wire along which pulses are launched as acoustic waves and from which they are recovered again as electrical signals by spaced coils surrounding the wire so as to produce or respond to magnetostrictive phenomena in the wire. Such a system is described, for example, in the publication "Tele-Tech and Electronic Industries," issue of March 1954, in an article entitled "Ultrasonic metal delay lines" at pages 78, 178–9.

The delayed and undelayed parts of the output from quantizer 38 are applied to pulse forming devices 40, 41, conveniently differentiating circuits, which evolve from quantized signals applied to them signals corresponding temporally to the scanning of the two edges of each object encountered in any one scanning line and having characteristics by which they may be separated. When differentiating circuits are used the evolved pulses will be positive- and negative-going and may therefore readily be separated by a polarity-sensitive device such as a diode rectifier or biased-off thermionic valve. These signals are arranged to have an appropriately brief duration which is hereafter designated as $T_1$. This duration must obviously be short compared with the duration of the signal derived by scanning an object of the minimum size which is to be counted.

The signals developed by device 40 from the delayed signal are applied to devices 43, 44, of which device 43 allows to pass only those signals corresponding to a transition from "black" to "white" while device 44 passes only signals arising from "white" to "black" transitions. Meanwhile the signals developed by device 41 from the undelayed signal are applied to devices 42, 45 of which device 42 passes only "black" to "white" and device 45 only "white" to "black" transitions.

The four series of signals thus developed are applied respectively to gate circuits 46, 47, 48, 49 of any suitable known type such that when a gate is "opened" by the application of a suitable signal to its control input an output corresponding to the selected signals is obtained.

Meanwhile, the delayed and undelayed signals are added in a mixer circuit 50 and are applied through a delay circuit 51 which delays them by a time $T_2$ to a bistable trigger circuit 52. The necessity for this delay has been previously explained. This trigger circuit has an overlap such that it remains in one or other of its stable conditions unless both the signals applied to the mixer change in the same sense from one of their two possible values to the other, that is, the trigger will change from one stable condition to the other only if both signals, which are initially the same, change from "black" to "white" or vice versa. The design of trigger circuits to have any required degree of overlap is discussed for example in an article by D. K. Ritchie entitled "The optimum D. C. design of flip-flops" which was published in "Proceedings of the Institute of Radio Engineers," volume 41, pages 1614–1617 (November 1953).

The circuit is arranged to provide a control signal which opens gates 46, 47 unless its condition is changed by both signals applied to mixer 50 becoming black. When this action occurs, gates 46, 47 are closed and gates 48, 49 are opened and remain open until a reverse transition of both signals has occurred.

The signals which pass through gates 46—49 are applied to similar counter circuits 53, 54, 55 and 56 of any kind suitable to the scanning speed employed. Electronic counters employing decade stages of the type evolved by the addition of feedback to a four-stage binary counter are adequate for the purpose.

Signals passed by gate 46 are those arising from a "black" to "white" transition in this signal which occurs when both signals were "white" when last the same previous to the scanning spot encountering the object giving rise to the transition. These signals correspond, therefore to C events.

Signals passed by gate 47 are those arising from a "black" to "white" transition in the "previous line" signal when both signals were "white" when last the same previous to the scanning spot encountering the object giving rise to the transition. These signals correspond, therefore, to D events.

Signals passed through gate 48 are those arising from "white" to "black" transitions occurring in the "previous line" signal at a time when both signals were "black" prior to the "black" to "white" transition in the previous line which preceded the transition giving rise to the recorded signal. These signals correspond therefore to E events.

Signals passed through gate 49 are those arising from "white" to "black" transitions occurring in "this line" at a time when both signals were "black" prior to the "black" to "white" transition in this line which preceded the transition giving rise to the recorded signal. These signals correspond therefore to F events.

The apparatus described therefore provides facilities for counting C, D, E and F events, while A and B events are discarded, since signals arising from "black" to "white" transitions are applied to gates which are open only if both signals were previously "white" and vice versa. A corrected count of C–E or D–F may thus be obtained.

It is, of course, not necessary in carrying out the invention that all four kinds of events should be counted; it is necessary to record only C and E events or D and F events; this is obviously done by omitting the appropriate devices 43, 47, 54 and 45, 49, 56 or 42, 46, 53 and 44, 48, 55, from the arrangement illustrated.

It is possible in carrying out the invention to make use of known computer technique to arrange that the number recorded by the E or F counter shall be automatically subtracted from that recorded by the C or D counter in order to reduce the opportunity for observer error.

When during the scanning process an object is encountered for the second or any subsequent time, then at some point during the resultant black signal arising in "this line" there will arise a black signal in the "previous line." When this occurs the "both white" gates 46 and 47 will be closed until both signals have again become "white." As the later of the two signals changes it provides a "black" to "white" transition which will be applied to gate 46, but the delay $T_2$ which has been introduced between trigger and gate circuits is made greater than the pulse duration $T_1$, so that the gate does not open until after the termination of the pulse. The upper limit to the delay period is set by the obvious requirement that the system shall be capable of resolving objects which yield pulses separated by a certain minimum time $T_3$, so that the condition for the allowable delay period is $T_1 < T_2 < T_3$.

So far no mention has been made of the function of the masking amplifier 36, the function of which will now be described.

Every finite object must have a closed boundary, but some of the objects in the scanned area may have parts of their boundaries outside the field of view. The resulting phenomena will depend upon the manner of limiting the field of view. In conventional television technique the signal is interrupted between successive lines and frames and replaced by a fixed level corresponding to black, thus providing a black mask round the reproduced picture. Black is chosen in this case to eliminate the flyback lines which would otherwise be visible on the receiver cathode ray tube, but a white mask is equally practicable.

A trivial consequence of using a black mask is the production of one E and one F event, so that whichever method of counting is used an addition of one must be made to the recorded count. Any object which crosses the edge of the mask becomes in effect, a modification of the shape of the mask and is not counted.

If a white mask is employed, any object which crosses the edge of the scanned area is sliced off by the mask and is counted as one whole object. If, therefore, counts are taken both with a black and with a white mask, the difference in the (corrected) counts indicates the number of objects interesecting the mask edge. In most cases it will be reasonable to assume that, on the average, the objects affected can be considered as being half within and half without the scanned area, so that the mean of the black mask and white mask counts gives the exact number of objects in the area.

If the objects are moving, their movement may be used to provide the slower component of the scanning process. For example, the objects counted may be carried on a moving conveyor belt or falling freely or sliding across the field of a line-scanning device. In such cases there are no limits to the field of view in the direction of movement of the objects, but there are still two edges terminating the line scan. In many such cases it will be possible to arrange that all the objects are clear of these edges, but where the objects may extend outside the scanned area a similar result to repeated scannings with black and with white mask (which would involve duplicating the bulk of the equipment) can be obtained by using one black edge mask and one white. This technique can also be extended to the case of stationary objects.

The counting method and apparatus hereinbefore described will render a correct count of objects having single closed boundaries. This definition is violated by an object pierced by an aperture, or locally so thin as to be transparent to the scanner. Such an object will, if it has one hole, record both C and E (or D and F) events and will therefore not be recorded. An object with two holes would be recorded as −1 and so on. It is considered unlikely that this difficulty will arise in practice.

I claim:

1. Apparatus for enumerating objects having reflecting or absorbing properties dispersed over a field comprising means for generating a beam of energy for which the reflecting or absorbing properties of said objects differ from those of said field and for causing said beam to be focused upon an area of said field less than the area of any object to be counted and to scan said field in a pattern of lines so spaced that any of said objects must be traversed by at least one of said lines, detector means responsive to variations in the energy of said beam during traversal of said field to produce an electrical signal varying in amplitude in like manner as said energy, means responsive to said signal for producing a quantized signal having one value when said beam is incident wholly upon one of said objects and another value when said beam is not incident upon an object, means for applying said quantized signal to delay means for reproducing said quantized signal after an interval equal to the time taken by said beam in tracing said scanning pattern to reach a corresponding point in an adjacent, subsequently scanned line, means responsive to said quantized signal to produce a pulse signal when said quantized signal changes from one to the other of its two values in one sense only, means for summing said delayed and undelayed quantized signals and feeding them to second delay means for reproducing said summed signals after a predetermined delay period, trigger means responsive to said delayed summed signals for deriving a control signal if said delayed and undelayed signals, when last of the same value had a predetermined one of their two possible values and gate means responsive to said control signal to permit the passage of said pulse signals to pulse counting means.

2. Apparatus according to claim 1 in which said beam of energy is a beam of light.

3. Apparatus according to claim 1 in which said beam of energy is a beam of electrons.

4. Apparatus according to claim 1 in which said delay means comprises a wire in which signals are launched and from which they are recovered by magnetostriction.

5. Apparatus according to claim 1 in which said trigger means comprises a trigger circuit having an overlap such that it remains in one or other of its stable conditions unless both the said signals change in the same sense from one of their two possible values to the other.

6. Apparatus according to claim 1 in which said second delay means delays said summed signals by an interval greater than the duration of said pulse signals.

7. Apparatus for enumerating objects having reflecting or absorbing properties dispersed over a field, said apparatus comprising means for generating a beam of radiation for which the reflecting or absorbing properties of said objects differ from those of said field, means for causing said beam to be focused upon an area of said field less than the area of any object to be counted and to scan said field in a pattern of lines so spaced that any of said objects must be traversed by at least one of said lines, detector means responsive to changes in the radiation energy of said beam during traversal of said field for producing an electrical signal varying in its amplitude in like manner as said radiation energy, means responsive to said signal to derive a quantized signal having one value when said beam is incident wholly upon one of said objects and a distinguishable value when said beam is not incident upon an object, means for applying said quantized signal to delay means for reproducing said quantized signal after an interval equal to the time taken by said beam of radiation in traversing said scanning pattern to reach a corresponding point in an adjacent subsequently scanned line, means responsive to said quantized signal for deriving a first train of pulses corresponding to transitions from a first to a second value in said signal, means responsive to said delayed quantized signal for deriving a second train of pulses corresponding to transitions from said second to said first value of said delayed signal means for summing said delayed quantized signal and said quantized signal, means for delaying said summed signal by a time greater than the duration of a pulse of either of said pulse trains, trigger means responsive to said delayed summed signal for deriving a control signal if said delayed and undelayed signals, when last of the same value, had each a predetermined one of their two possible values, gate means responsive to said control signal to permit the passage of pulses of said first pulse train to a first pulse counting means and gate means responsive to said control signal to permit the passage of pulses of said second pulse train to a second pulse counting means.

8. Apparatus according to claim 7 and including means for operating upon said electrical signal produced by said detector to cause it to assume predetermined values immediately prior to and immediately subsequent to the scanning of each line.

9. Apparatus according to claim 7 and including means for operating upon said electrical signal produced by said detector to cause it to assume a selected one of two values corresponding respectively to maximum and minimum possible brightness in the scanned area immediately prior to and immediately subsequent to the scanning of each line.

References Cited in the file of this patent

UNITED STATES PATENTS 2,731,202    Pike _____ Jan. 17, 1956

OTHER REFERENCES

"Automatic Counting of Microscopic Particles," by F. Roberts and W. H. Walton, "Nature" (London), vol. 169, page 518, 1952.

"The Physics of Particle Size Analysis," British Journal of Applied Physics, Supplement No. 3, April 1954, pages 121–175 relied on.